United States Patent [19]
Anderson et al.

[11] Patent Number: 6,044,631
[45] Date of Patent: Apr. 4, 2000

[54] CUTTING UNIT STABILIZING MECHANISM

[75] Inventors: Donald Theodore Michael Anderson, Oshkosh; Frank Kenneth O'Toole, West Bend, both of Wis.

[73] Assignee: Deere & Company, Moline, Ill.

[21] Appl. No.: 09/016,085

[22] Filed: Jan. 30, 1998

[51] Int. Cl.[7] .................................................. A01D 34/44
[52] U.S. Cl. ...................................................... 56/7; 56/249
[58] Field of Search .................................. 56/1, 6, 7, 10.9, 56/11.9, 14.4, 17.2, 208, 249; 280/43

[56] References Cited

U.S. PATENT DOCUMENTS

| | | | |
|---|---|---|---|
| 3,613,340 | 10/1971 | Akgulian et al. | 56/249 |
| 4,866,917 | 9/1989 | Phillips et al. | 56/7 |
| 5,297,378 | 3/1994 | Smith | 56/7 |
| 5,343,680 | 9/1994 | Reichen et al. | 56/249 |
| 5,412,931 | 5/1995 | Reichen et al. | 56/199 |
| 5,459,984 | 10/1995 | Reichen et al. | 56/7 |
| 5,533,326 | 7/1996 | Goman et al. | 56/7 |
| 5,579,849 | 12/1996 | Houck | 172/456 |

FOREIGN PATENT DOCUMENTS

35488/68  10/1970  Australia .

*Primary Examiner*—Robert Pezzuto

[57] ABSTRACT

A linkage for a reel mower cutting unit including upper and lower stop members which abut a yoke for restricting the movement of the yoke and cutting unit when the cutting unit is raised to a transport position.

19 Claims, 6 Drawing Sheets

CUTTING UNIT STABILIZING MECHANISM

This invention pertains to linkages which support a reel mower cutting unit in a raised transport position.

Reel mowers are typically used to mow turf areas such as golf courses that must be mowed very accurately. These cutting units include a cylindrical cutting reel having cutting blades that rotate about the laterally extending central axis of the cylindrical reel. The blades pass closely by a stationary bedknife, and grass is cut with a shearing or scissoring action between the rotating blades and the stationary bedknife. The cutting units are supported on the ground surface by front and rear rollers mounted with the frame structure of the cutting units. These reel mower cutting units are typically coupled with powered vehicles for propelling the cutting units across the ground in the turf area to be mowed. A linkage structure is provided for coupling the cutting unit with the vehicle. The linkage structure typically includes a push arm that is pivotally mounted to the vehicle for pivotal motion about an axis extending longitudinally with respect to the vehicle. The push arms extend forwardly and laterally outwardly from the vehicle. Hydraulic cylinders coupled with the push arms can be actuated for lifting the push arms between raised positions whereat the cutting unit is held in a transport position and a lowered position whereat the cutting unit is allowed to roll in contact with the ground during mowing operations. A yoke is typically coupled with the front end of the push arm and extends rearwardly to a pivotal connection with the cutting unit. Therefore the push arm is in compression pushing the yoke forwardly, and the yoke is in tension pulling the cutting unit from the forward end portion of the push arm. The yoke is pivotally connected to the push arm to allow the yoke and cutting unit to pivot from side to side with respect to the push arm about an axis extending longitudinally with respect to the vehicle. This pivotal connection, in conjunction with the cutting unit's pivotal connection with the yoke and the pivotal connection of the push arm to the vehicle, allow the cutting unit to roll along in close contact with the ground even when undulating ground contours are encountered. Cut quality is thereby enhanced.

During mowing operations, an operator is often required to lift the cutting units off the ground. This is often done at the end of a mowing pass when the operator must turn the vehicle around to make another pass in the opposite direction on the area of turf being mowed. At the end of a pass, the operator will therefore actuate the hydraulic cylinders to lift the cutting units. When the hydraulic cylinders are actuated, the push arms swing upwardly about their pivotal connections with the vehicle and raise the yokes and cutting units to their transport positions. In the raised position, the cutting units are generally free to swing from side to side about the connection between the yoke and the push arm. One of the cutting unit's outer edges may swing down during transport and strike the ground. The cutting units are particularly prone to striking the ground when operating next to a side slope. When the cutting unit strikes the ground in this manner the turf may be scuffed or damaged. Since the cutting unit is allowed to swing side to side in the transport mode the cutting unit may swing due to centrifugal force experienced during execution of a turn, which can cause an outer edge of the cutting unit to undesirably swing down into contact with the ground. Excessive swinging of the cutting unit during execution of a turn can also cause the yoke or cutting unit to swing upwardly and strike the underside of the vehicle.

When conventional reel mowers are lowered to the ground to again initiate mowing operations, conventional linkages often allow the cutting units to be lowered or dropped back onto the ground surface while the cutting unit is tilted from a horizontal position. For example, if one side of the cutting unit is heavier than the other, that side will tend to tilt downwardly in the transport mode and will tend to strike the ground first when the cutting unit is lowered or dropped to the ground to initiate mowing operations. The side of the cutting unit to which the hydraulic motor is mounted tends to dip or swing downwardly if the cutting unit is not provided with counterweights on the side of the cutting unit opposite the hydraulic motor. Even if the weight of the cutting unit is distributed evenly in balanced fashion, the cutting unit may swing out of a horizontal position when raised to the transport mode. Operators often lower the cutting units to the ground while the vehicle is moving, and when the cutting unit is lowered to the ground in a non-level fashion, the ground struck by the cutting unit can be scuffed or otherwise damaged.

Therefore, it would be desirable to provide a cutting unit that does not strike the ground or the underside of the vehicle when the cutting unit is raised to its transport position. It would also be desirable to provide a reel mower cutting unit linkage that reduces the damage to the turf caused by the cutting unit being lowered to the ground in non-level fashion.

SUMMARY OF THE INVENTION

The preferred embodiment of the present invention provides a linkage mechanism that stabilizes a reel mower cutting unit in a raised transport position. A push arm is pivotally mounted with the vehicle frame. A pivotal connection device carried at the front end portion of the push arm pivotally supports a pin member to which a yoke is fixed. Legs of the yoke extend downwardly and are pivotally coupled with the sides of the cutting unit frame. Rollers mounted with the cutting unit roll in contact with the ground during mowing operations to support the cutting unit at the proper height above the ground to cut grass at the desired length. The cutting unit can be raised from the lowered mowing position to a raised transport position. To do this a hydraulic cylinder is operated to swing the push arm up about its pivotal connection with the vehicle frame. The yoke and cutting unit coupled with the front end of the push arm shift upwardly with the push arm. A lower stop member fixed with the front end of the push arm near the pivotal connection device is positioned directly beneath the yoke. As the push arm is raised, the lower stop member shifts upwardly therewith and abuts the underside of the yoke. This tends to hinder the yoke and cutting unit from swinging. As the push arm continues to be raised the top portion of the yoke will abut the underside of an upper stop member. The abutment of the yoke against the upper stop member serves as an end stop for upward motion of the linkage when raising the linkage to the transport position. When fully raised to the transport position the yoke is captured between the upper and lower stop members. The yoke isfirmly and rigidly held in position by the pivotal connection device and by abutment with the upper and lower stop members. The cutting unit is thereby generally prevented from swinging from side to side when in the transport mode, and the cutting unit will therefore not strike the ground or side slopes during execution of turns, and will not swing up and strike the underside of the vehicle. The upper and lower stop members include V-shaped surfaces that help positively locate the yoke when shifting to the transport position, and help to secure the yoke against movement when the transport mode is achieved.

When the operator wishes to lower the cutting unit to the ground to resume mowing operations he will operate the hydraulic cylinder to swing the push arm downwardly about its pivotal connection with the vehicle frame. As the front portion of the push arm shifts downwardly the lower stop member and yoke shift downwardly therewith. The lower stop member remains in abutment with the underside of the yoke as the yoke begins to shift downwardly, and thereby helps to guide the yoke and cutting unit downwardly in level fashion such that the cutting unit will engage the ground smoothly so as not to scuff or mar the turf surface. Once the cutting unit is positioned on the ground surface it is free to pivot nd shift with respect to the vehicle so that it closely follows undulations in ground contours.

DETAILED DESCRIPTION OF THE PREFERRED EMBODIMENT

Figure 1:
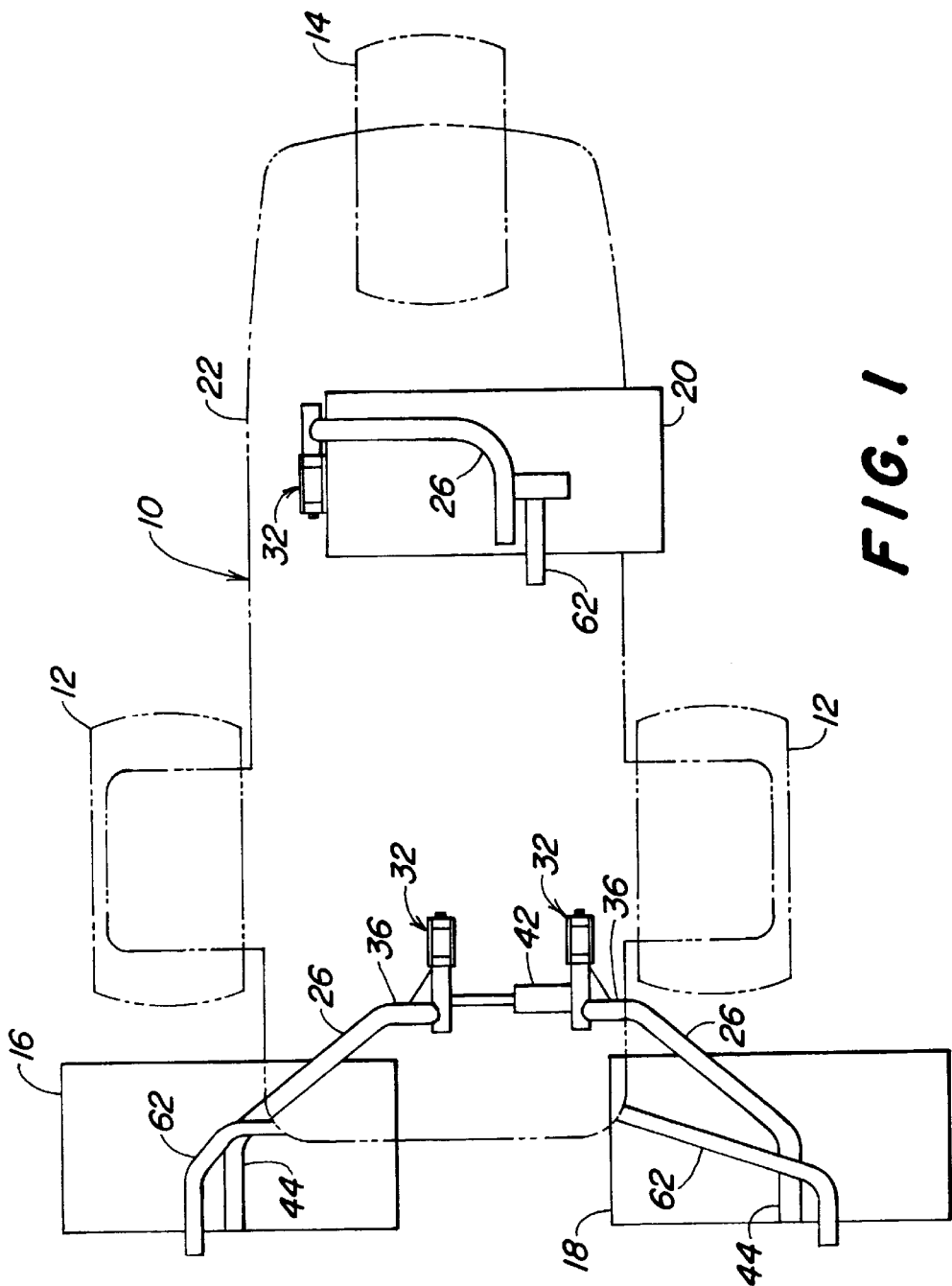
FIG. 1 is an overhead schematic view of a reel mower vehicle and cutting units with which the present invention is adapted for use.

Referring now to FIG. 1, there is shown a schematic view of a vehicle 10 with which the present invention is adapted for use. A powered mowing vehicle 10 includes a pair of front ground engaging wheels 12, and a single rear wheel 14. A pair of front reel mower cutting units 16 and 18 are mounted to the front of the vehicle 10, and a rear cutting unit 20 is mounted beneath the vehicle 10 between the front and rear wheels 12 and 14. Each cutting unit 16, 18 and 20 is coupled to the vehicle frame 22 by way of a linkage 24 according to the present invention that includes a push arm 26, a pivotal connection device 28 and a yoke 30, as will be described in greater detail below.

Figure 2:
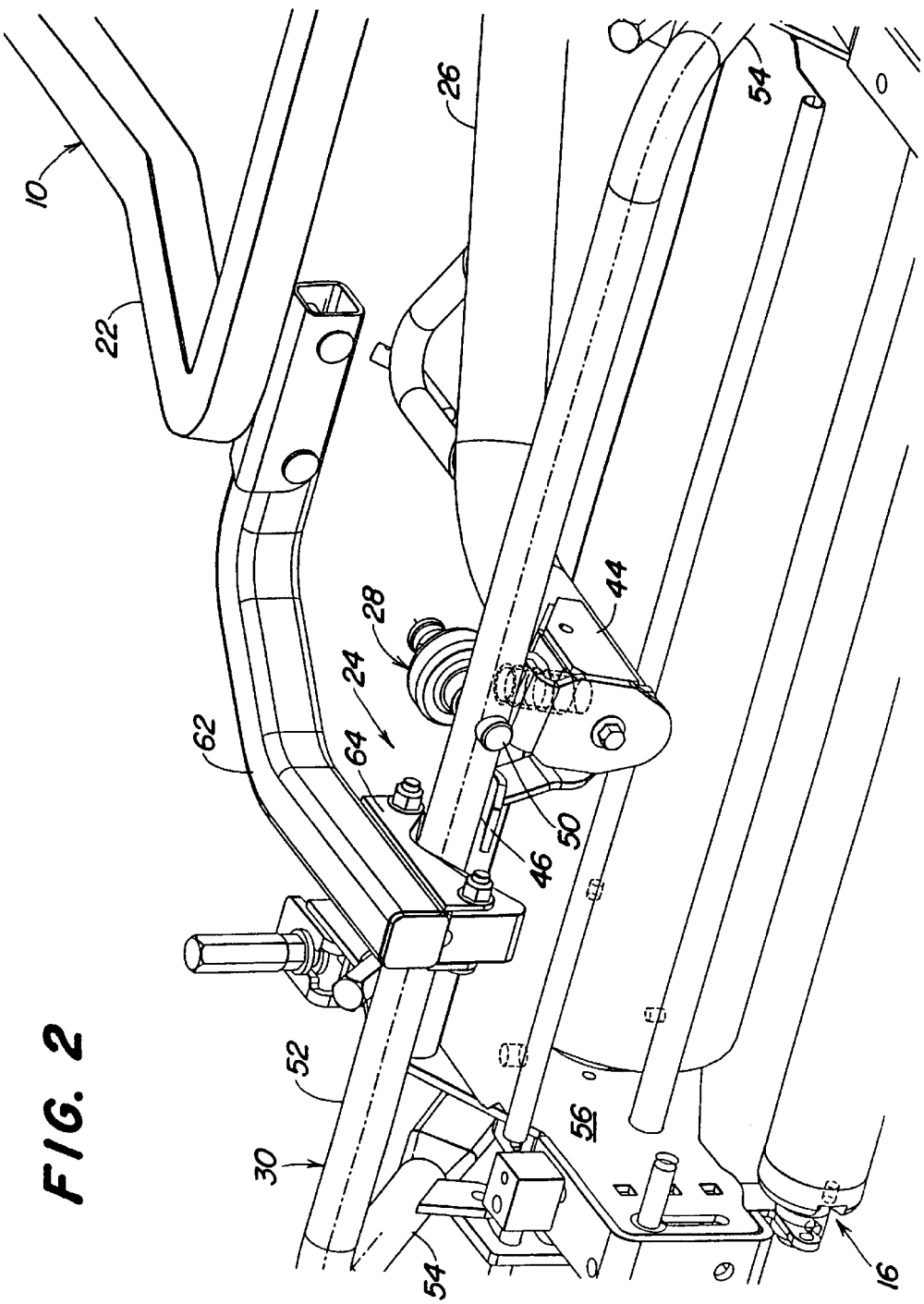
FIG. 2 is a perspective partial view from in front of the vehicle showing the right front cutting unit and the linkage mechanism according to the present invention that couples that cutting unit to the vehicle frame. The cutting unit is shown in a raised transport position.
Figure 4:
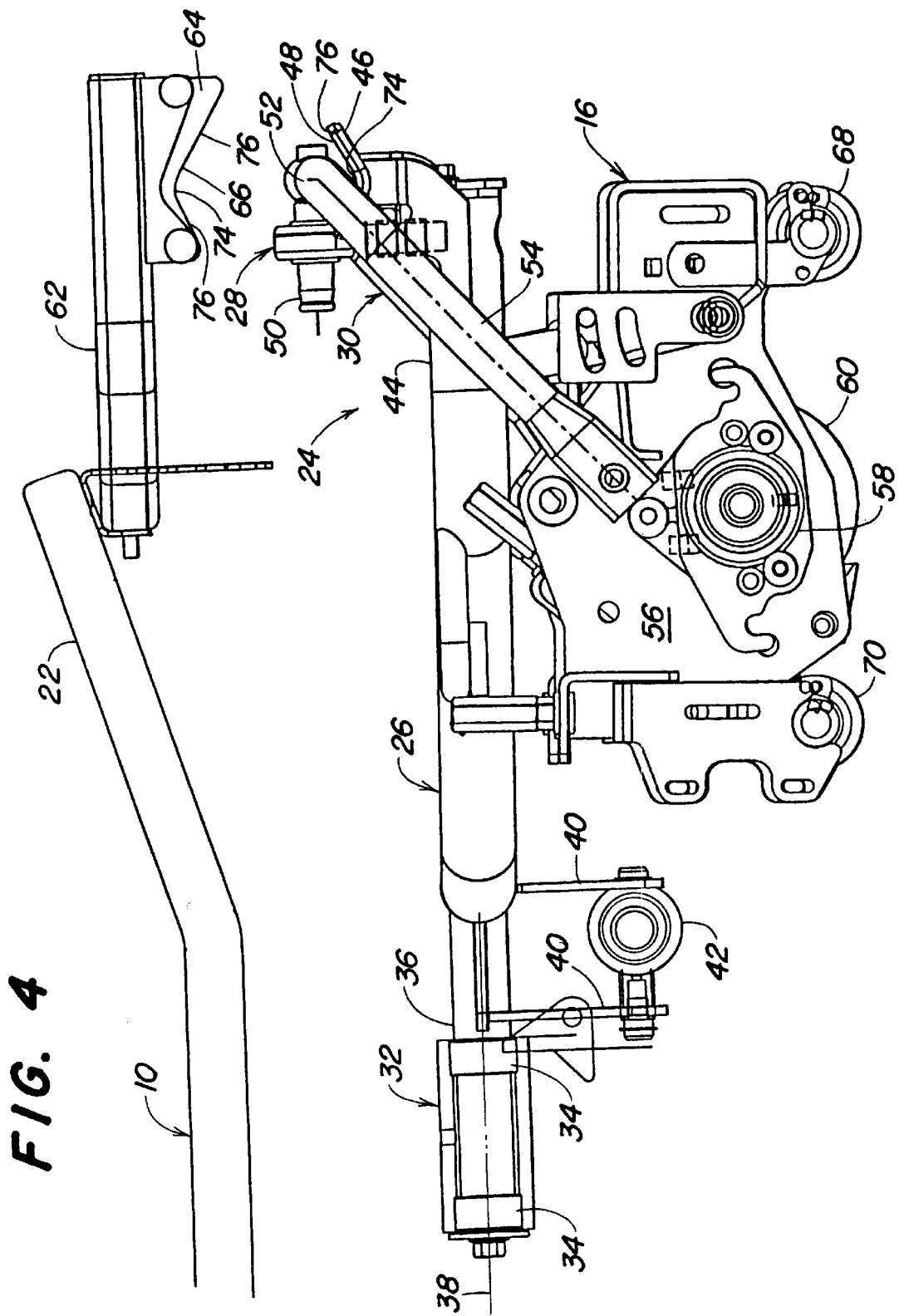
FIG. 4 is a side partial view from the right side of the vehicle showing the right front cutting unit and the linkage according to the present invention in a lowered position for normal mowing operation.
Figure 5:
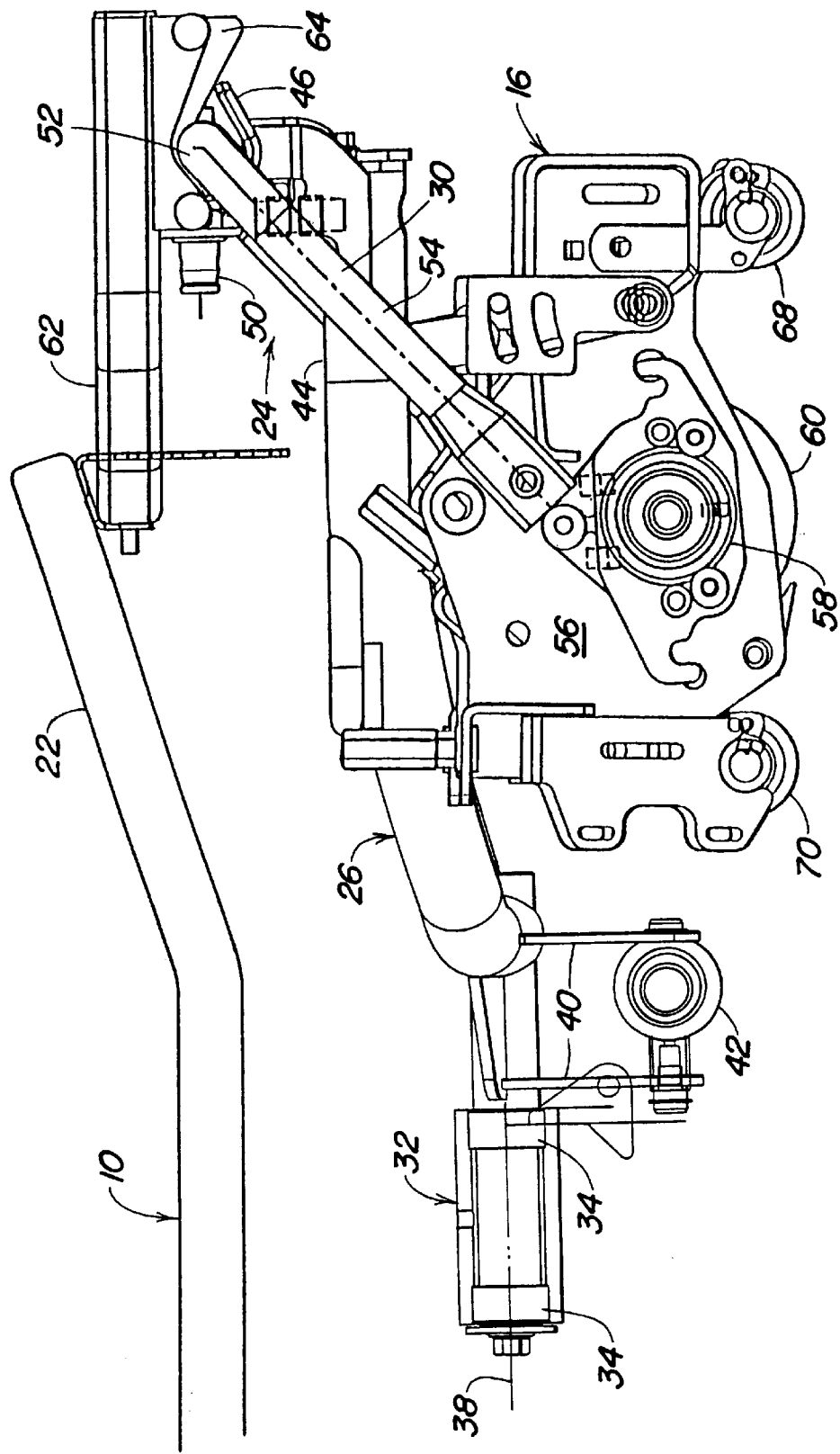
FIG. 5 is a side partial view of the device shown in FIG. 4 with the cutting unit in a raised transport position.

Referring now to FIGS. 2 and 4, there is shown the right front cutting unit 16 and linkage 24, which will be described in detail. Coupled to the vehicle frame 22 is a pivot mechanism 32 that includes a pair of bearings 34 which pivotally receive the rear end portion 36 of a push arm 26. The bearings 34 define an axis 38 that extends longitudinally with respect to the vehicle 10. The push arm 26 is pivotable about this axis 38. A pair of fingers 40 extend downwardly from the push arm 26. A hydraulic cylinder 42 is coupled between the vehicle frame 22 and the fingers 40. An operator can extend and retract the hydraulic cylinder 42, which swings the fingers 40 about the pivot axis 38 of the pivot mechanism 32, and thereby causes the push arm 26 to swing about the axis 38 defined by the bearings 34. The push arm 26 extends forwardly and laterally outwardly from the centerline of the vehicle 10. Fixed to the front end portion 44 of the push arm 26 is a pivotal connection device or universal joint 28. A first stop member or lower stop member 46 having a V-shaped surface portion 48 is also rigidly fixed to the front end portion 44 of the push arm 26. A pin member 50 extending through the pivotal connection device 28 is fixed with the yoke 30. The yoke 30 has a laterally extending central portion 52 and a pair of downwardly and rearwardly extending legs 54. The lower ends of the yoke's legs 54 are pivotally coupled with the sides of the frame 56 of the cutting unit 16. On the right hand side portion of the cutting unit's frame 56 is mounted a hydraulic motor 58 that receives hydraulic power from the vehicle's hydraulic system. The hydraulic motor 58 transmits rotational power in conventional fashion to the cylindrical cutting reel 60 housed within the frame 56 of the cutting unit 16. Counterweights are coupled with the side of the cutting unit frame 56 opposite the hydraulic motor 58 for balancing the cutting unit 16 from side to side. A support member 62 is rigidly fixed with and extends forwardly from the vehicle frame 22. A second stop member or upper stop member 64 is rigidly fixed with the support member 62 and includes a V-shaped surface 66 abutable with the yoke 30 as will be described in greater detail below.

Next the operation of the present invention with the right front cutting unit will be described in greater detail. During normal cutting operations, the right front cutting unit 16 is in the configuration shown in FIG. 4. In this mode of operation the hydraulic pressure is generally released from the hydraulic cylinder 42, and therefore the push arm 26 is allowed to swing downwardly under the weight of the cutting unit 16 mounted to the front end 44 of the push arm 26. Front and rear rollers 68 and 70 mounted with the cutting unit 16 roll in contact with the ground to support the cutting unit 16 at the desired height above the ground to thereby allow the cutting unit's reel blades 60 and bedknife to cut grass at the desired height. The cutting unit 16 is pulled forwardly by the yoke 30, and the yoke 30 is generally pushed or pressed forwardly by the push arm 26 coupled with the vehicle 10. As ground undulations are encountered, the cutting unit 16 is free to ride over the undulations in close contact with the surface of the ground. The pivotal connection device 28, the yoke's pivotal connection with the cutting unit 16, and the push arm's pivotal connection 32 to the vehicle frame 22 allow the cutting unit 16 to closely follow undulations in ground contours.

The operator can raise the cutting unit 16 to a transport mode, such as when he has completed a mowing pass and wishes to execute a U-turn before making an adjacent pass in the opposite direction. To raise the cutting unit 16 off the ground to its transport position the operator extends the hydraulic cylinder 42 which forces the push arm 26 to swing upwardly about its connection 32 to the vehicle frame 22. As the push arm 26 swings up, the forward end 44 of the push arm 26 shifts upwardly, and the lower stop member 46 shifts upwardly therewith. As the front end 44 of the push arm 26 shifts up, the yoke 30 will also shift up and lift the cutting unit 16 off the ground. The cutting unit 16 will then tend to swing downwardly and forwardly as it is lifted off the ground, but a chain 72 that extends between the cutting unit 16 and the push arm 26 limits the motion of the cutting unit 16 in this direction. As the cutting unit 16 is lifted off the ground the cutting unit 16 and yoke 30 are free to swing slightly side to side about a forwardly extending axis defined by the pivotal connection device 28. As the operator lifts the cutting unit the yoke 30 can swing into abutment with the V-shaped surface 48 of the lower stop member 46. The yoke 30 and cutting unit 16 are therefore blocked from pivoting in one direction by abutment of the yoke 30 against the lower stop member 46. The operator continues to raise the cutting unit 16 until the upper surface of the yoke 30 abuts against the V-shaped surface portion 66 of the upper stop member 64. The linkage 24 is then generally blocked from shifting further upwardly.

The V-shaped surfaces 48 and 66 defined by the lower and upper stop members 46 and 64 help to guide and center the yoke 30 toward the notch 74 defined by the V-shaped surfaces 48 and 66. When the yoke 30 and cutting unit 16 are being raised, if the yoke 30 abuts a flat portion 76 of a stop 46 and 64 the yoke 30 will slide along the flat surface 76 into the deepest portion of the notch or valley 74 defined by the V-shaped surface 48 and 66. The V-shaped surfaces 48 and 66 also help to firmly and securely retain the yoke 30 in a single position within the deepest portions 74 of the V-shaped surfaces 48 and 66 once the cutting unit 16 is fully raised to its transport position.

With the push arm 26 in the raised position and the yoke 30 confined in abutment between the upper and lower stop members 66 and 46, the yoke 30 and cutting unit 16 are generally prevented from swinging from side to side about the pivotal connection device 28. The pivotal connection device 28 and upper and lower stop members 64 and 46 define three points at which movement of the yoke 30 is confined. These three points, along with the V-shaped surfaces 48 and 66 of the stop members 46 and 64, serve to generally block the yoke 30 from swinging about the pivotal connection device 28. The yoke 30 and cutting unit 16 are thereby prevented from swinging from side to side when the operator lifts the cutting unit 16 to the transport position. When the operator executes a turn with the cutting unit 16 in a raised position, the present invention generally holds or captures the yoke 30 in position which generally prevents the cutting unit 16 from swinging downwardly into contact with the ground due to centrifugal force experienced during the turn. All the cutting units 16, 18 and 20 are held at a uniform height, and the cutting units 16, 18 and 20 are generally prevented from swinging into contact with side slopes while held in the transport position. The cutting units 16, 18 and 20 and yokes 30 are also blocked from swinging up into contact with the underside of the vehicle 10 when the cutting units 16,18 and 20 are held in the transport mode.

When the operator wishes to return the cutting unit 16 to the ground to resume normal mowing operations the operator will manipulate controls to allow the hydraulic pressure to be released from the hydraulic cylinder 42. The weight of the cutting unit 16 will shift the push arm 26 downwardly and force hydraulic fluid out of the cylinder 42 until the cutting unit's rollers 68 and 70 come to rest on the ground surface. The lower stop member 46 supports the yoke 30 as the cutting unit 16 begins to be lowered, and generally blocks the yoke 30 from pivoting excessively in one direction during the lowering process. Therefore, the cutting unit 16 will be oriented close to horizontally such that the outer edges of the cutting unit 16 will not gouge or mar the turf surface excessively when the cutting unit 16 contacts the ground.

Figure 3:
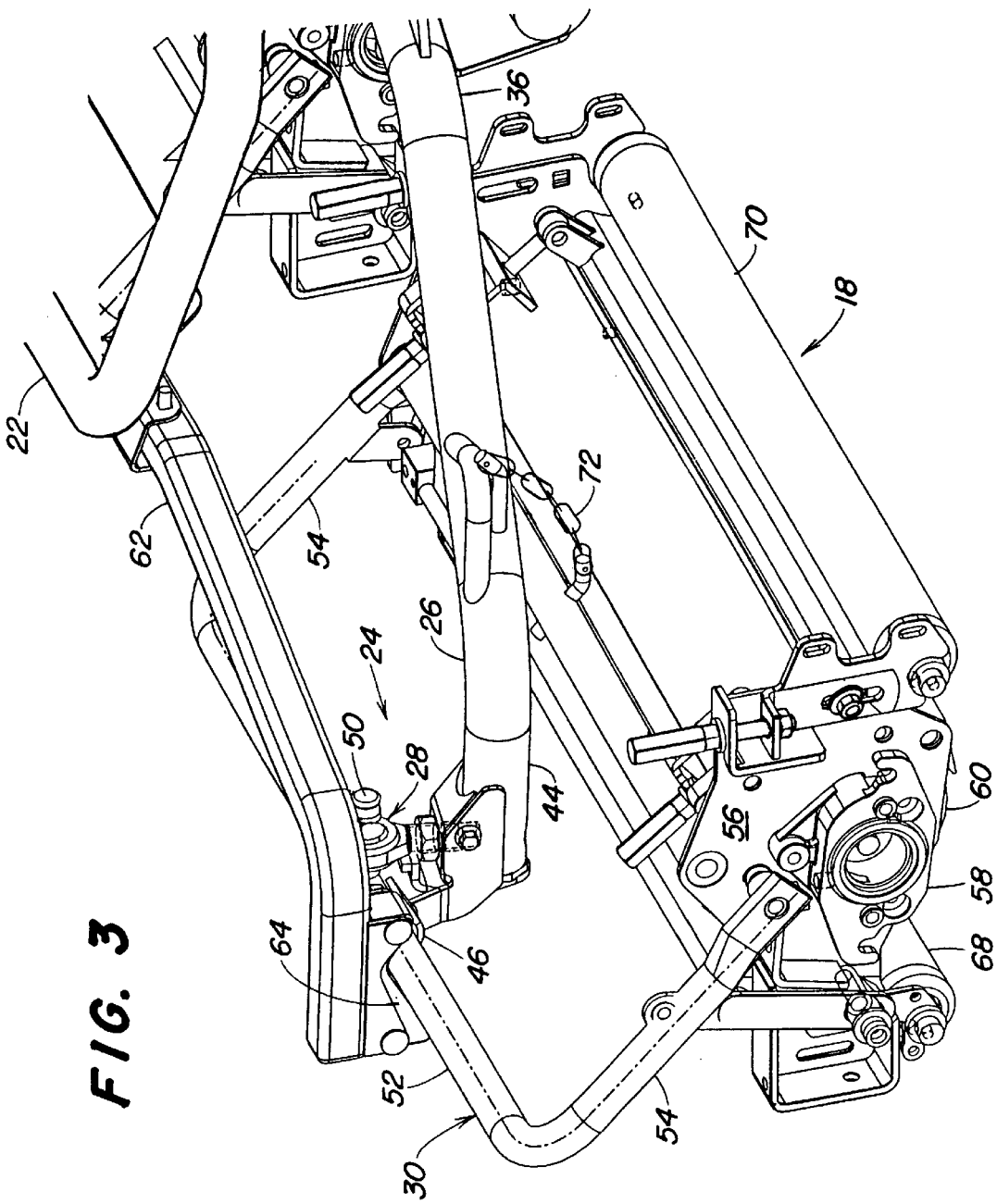
FIG. 3 is a perspective partial view from the left side of the vehicle illustrating the left front cutting unit and the linkage according to the present invention that couples that cutting unit with the vehicle frame. The cutting unit is shown approaching the raised transport position.
Figure 6:
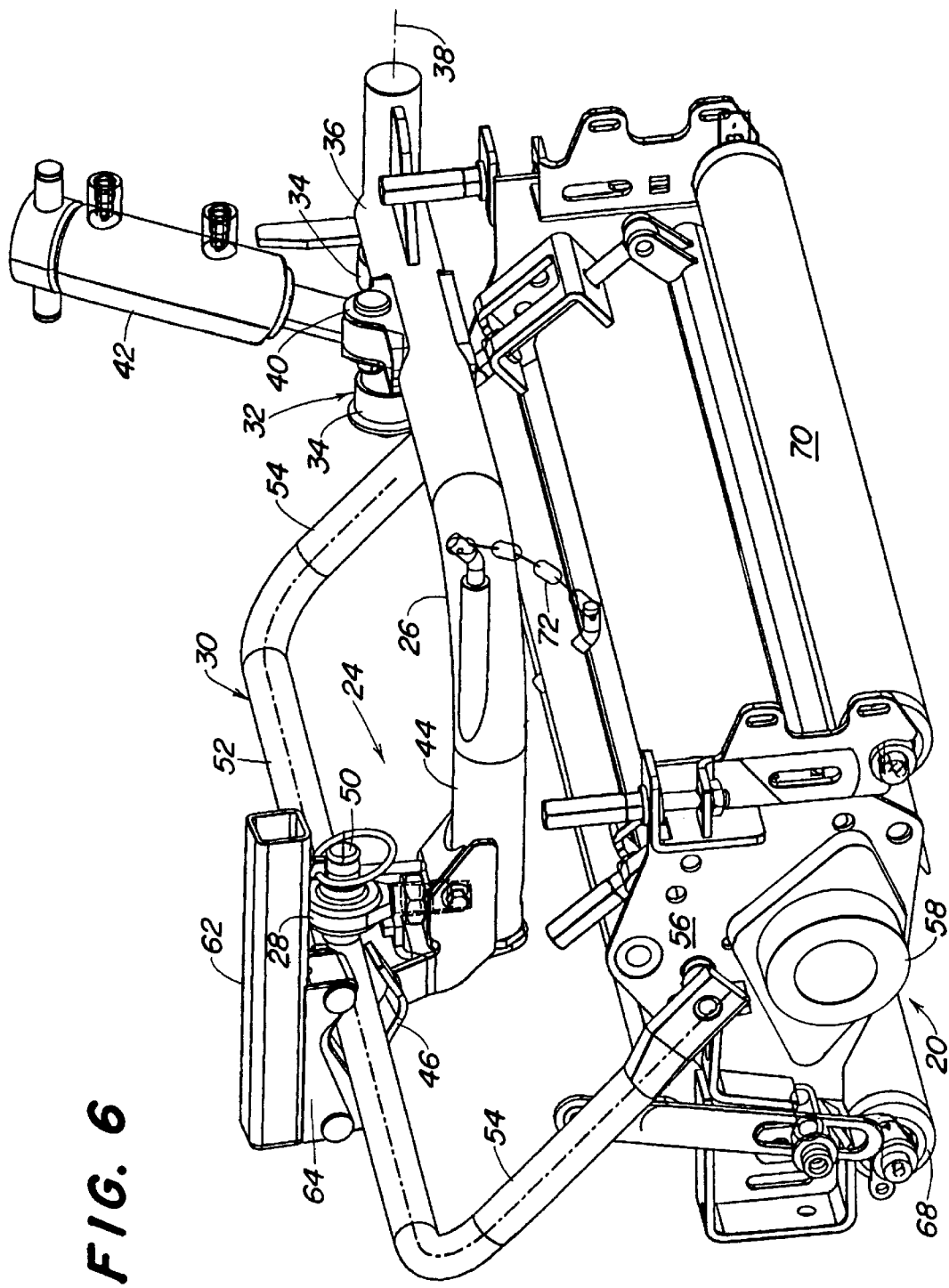
FIG. 6 is a perspective partial view from the left side of the vehicle showing the rear cutting unit and the linkage which coupled that cutting unit with the vehicle frame. For clarity, the vehicle frame is not shown. The rear cutting unit is shown in the raised transport position.

Only the right front cutting unit 16 and associated linkage mechanism 24 are described in detail above. Similar linkage mechanisms 24 couple the left front cutting unit 18 and the rear cutting unit 20 to the vehicle 10. The left front cutting unit 18 and the rear cutting unit 20 and corresponding linkage mechanisms 24 are shown in FIGS. 3 and 6.

I claim:

1. A mechanism for stabilizing a reel mower cutting unit when the cutting unit is held in a transport position with respect to a powered vehicle, said mechanism comprising:

an arm shiftably coupled with the vehicle, and transmits forward motion of the vehicle to the cutting unit during mowing operations, a pivotal connection device coupled with the arm, and transmits forward motion of the vehicle to the cutting unit during mowing operations, a yoke operatively coupled between the pivotal connection device and the cutting unit, and transmits forward motion of the vehicle to the cutting unit during mowing operations, and first and second stop members shiftable for abuting the yoke and confining the yoke in a particular position for blocking the yoke and cutting unit from pivoting when the yoke and cutting unit have been raised to a transport position.

2. The invention of claim 1, wherein:

the second stop member is an upper stop member fixed with the vehicle, and the first stop member is a lower stop member coupled with the arm for shifting therewith, said arm being shiftable upwardly for lifting the yoke and cutting unit to a raised transport position, and in the raised transport position the yoke is confined between the upper and lower stop members for blocking the yoke and cutting unit from pivoting.

3. The invention of claim 2, wherein the lower stop member shifts upwardly with the arm and into abutment with the underside of the yoke as the arm shifts to the transport position.

4. The invention of claim 3, wherein the lower stop member operatively presses the yoke upwardly against the upper stop member as the arm shifts to the transport position.

5. The invention of claim 2, wherein the lower stop member is positioned laterally adjacent to the pivotal connection device.

6. The invention of claim 5, wherein the upper stop member is positioned laterally adjacent to the lower stop member on a side of the lower stop member opposite the pivotal connection device.

7. The invention of claim 2, wherein the upper and lower stop members are positioned to the same side of the pivotal connection device as a hydraulic motor coupled with the cutting unit for driving reel mower blades of the cutting unit.

8. The invention of claim 2, wherein the upper stop member includes a V-shaped surface abutable with the yoke.

9. The invention of claim 2, wherein the lower stop member includes a V-shaped surface abutable with the yoke.

10. The invention of claim 2, and further comprising a support structure which extends outwardly from the vehicle for supporting the upper stop member.

11. A linkage for coupling a reel mower cutting unit with a powered vehicle, said linkage comprising:

an arm shiftably coupled with the vehicle, said arm transmits forward motion of the vehicle to the cutting unit during mowing operations, a pivotal connection device coupled with the arm, said pivotal connection device transmits forward motion of the vehicle to the cutting unit during mowing operations, a yoke operatively coupled between the pivotal connection device and the cutting unit, said yoke transmits forward motion of the vehicle to the cutting unit during mowing operations, an upper stop member fixed with the vehicle, a lower stop member coupled with the arm and positioned laterally between the upper stop member and the pivotal connection device, the arm being shiftable upwardly for lifting the yoke and cutting unit to a raised transport position, and in the raised transport position the yoke is confined between the upper and lower stop members for hindering the yoke and cutting unit from pivoting from side to side.

12. The invention of claim 11, wherein the lower stop member shifts upwardly with the arm and into abutment with the underside of the yoke as the arm shifts to the transport position.

13. The invention of claim 12, wherein the lower stop member operatively presses the yoke upwardly against the underside of the upper stop member as the arm shifts to the transport position.

14. The invention of claim 11, wherein the upper stop member includes a V-shaped surface abutable with the yoke.

15. The invention of claim 11, wherein the lower stop member includes a V-shaped surface abutable with the yoke.

16. The invention of claim 11, and further comprising a support structure which extends outwardly from the vehicle for supporting the upper stop member.

17. The invention of claim 13, wherein the upper stop member includes a V-shaped surface abutable with the yoke.

18. The invention of claim 17, wherein the lower stop member includes a V-shaped surface abutable with the yoke.

19. The invention of claim 18, and further comprising a support structure which extends outwardly from the vehicle for supporting the upper stop member.

* * * * *